Oct. 10, 1961 R. GRZYMEK 3,003,294
CLAMPING MECHANISM FOR MACHINE TOOL
Filed Jan. 13, 1959

INVENTOR.
ROLF GRZYMEK.
BY Howard Keiser
John F. Verhoeven
ATTORNEYS.

United States Patent Office 3,003,294
Patented Oct. 10, 1961

3,003,294
CLAMPING MECHANISM FOR MACHINE TOOL
Rolf Grzymek, Cincinnati, Ohio, assignor to The Cincinnati Milling Machine Co., Cincinnati, Ohio, a corporation of Ohio
Filed Jan. 13, 1959, Ser. No. 786,502
3 Claims. (Cl. 51—240)

The present invention relates to a clamp to lock one member of a machine tool against movement or rotation relative to another member thereof.

In many machine tools having a movable or rotatable member, such as a swivel table which carries a workpiece and which is pivotally mounted on a support member, it is necessary to clamp the member in a selected position for the forming operation on the workpiece. When the movable or rotatable member is clamped down against the support member deflection is introduced which is deleterious to accurate forming of the workpiece. For example, if the clamp has a portion bearing against the movable or rotatable member, a portion bearing against the support member, and a bolt engaged with the clamp and threadedly received in the support member between said portions, the support member will be bowed when the bolt is drawn tight, thereby affecting the position of the support member and displacing the workpiece relative to the cutting element of the machine tool.

It is an object of the present invention to provide a clamping mechanism by which two machine tool members can be clamped against movement or rotation relative to each other without deflection from their respective planes.

It is another object of the present invention to provide a simple, effective clamping mechanism to lock a swivel table against rotation without displacing the workpiece mounted thereon relative to the cutting element.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2:
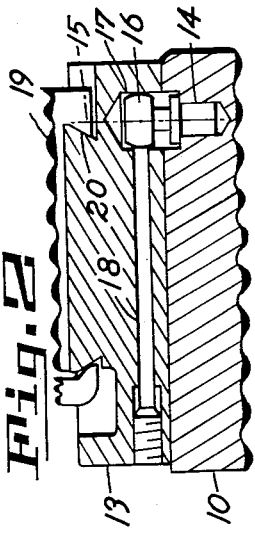
FIG. 2 is a view taken on the line 2—2 of FIG. 1.

The present invention may be illustrated in conjunction with a machine tool having a support member 10 which may, for example, be an elongated slide mounted on the base of the machine (not shown) for longitudinal movement past a cutting element, such as a grinding wheel 12, also mounted on the base of the machine. The reciprocation of the support 10, and the feeding and retraction of the cutting element normal to the direction of the movement of the support, may be accomplished by any convenional means. Another member 13 which may, for example, be a swivel table, lies in a plane above the support member 10 and is pivotally mounted thereon to rotate in said plane about a pivot axis defined by the longitudinal axis 15 of pivot pin 14. Pin 14 is embedded in the support member 10, as shown in FIG. 2, and has a head 16 which is rotatably received in bore 17 of the swivel table 13, play in the fit being eliminated by rod 18 threadedly received in the swivel table and having one end engageable with head 16.

Figure 3:
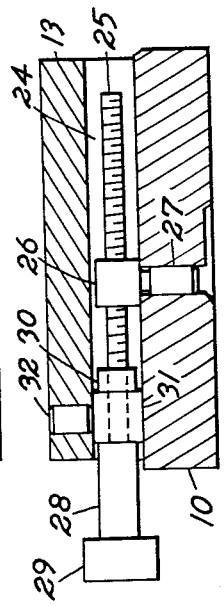
FIG. 3 is a view taken on the line 3—3 of FIG. 1.
Figure 4:
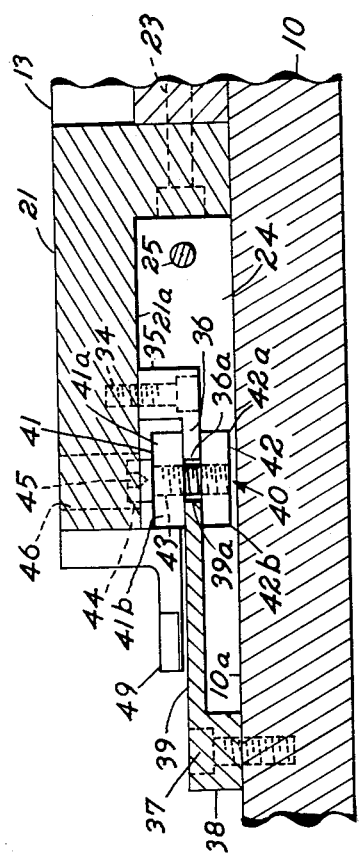
FIG. 4 is a view taken on the line 4—4 of FIG. 1.
Figure 1:
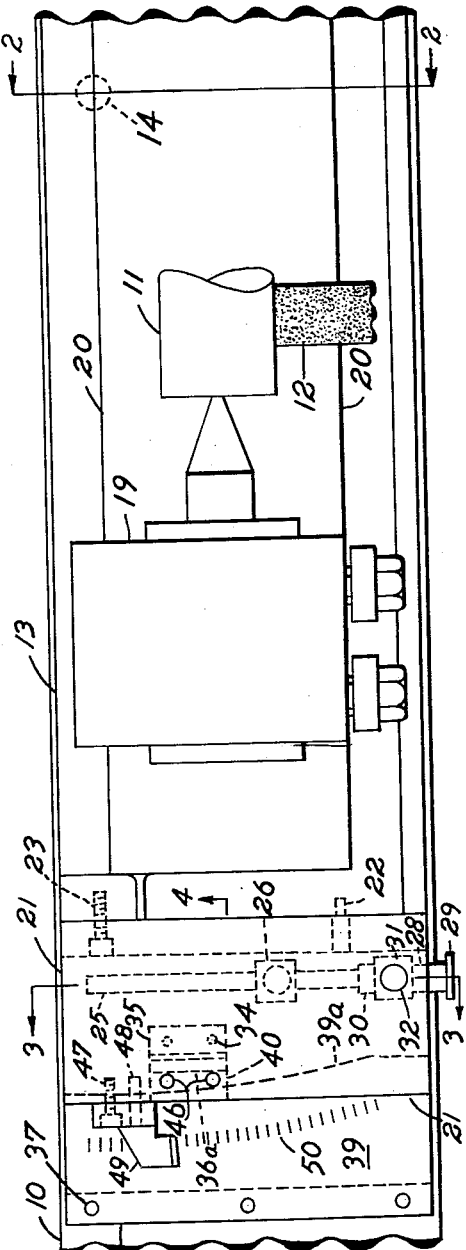
FIG. 1 is a fragmentary plan view of the swivel table of a grinding machine pivotally mounted on a support therefor.

The swivel table 13 has means to support the workpiece 11 including a headstock (not shown) and a tailstock 19 mounted on ways 20 formed on the swivel table. The swivel table 13 includes an end portion 21 connected to the main portion of the table by pin 22 and bolt 23, as shown in FIGS. 1 and 4. End portion 21 of the swivel table has a lower surface 21a spaced from and parallel to the top surface 10a of support member 10, the spaced surfaces defining a recess 24 under the edge of the swivel table 13. Rotation of the table 13 about the pivot axis 15 is accomplished by a lead screw 25 threadedly engaged with nut 26 in recess 24. The nut 26 has a pin 27 integral therewith which is pivotally received in support member 10, as shown in FIG. 3. Screw 25 has secured thereto a shank 28 terminating in knob 29 and, spaced from the shank, a collar 30. A sleeve 31, in which screw 25 is loosely received, is located between the shank 28 and collar 30 and is pivotally connected by the pin 32, which is integral therewith, to swivel table 13. It will be evident that by rotation of knob 29 the table member 13 may be swung about the pivot axis 15 to selected positions relative to support member 10.

Connected to the lower surface 21a of table end portion 21 by bolts 34 is a bracket 35 having a flange 36 spaced from the table surface 21a and extending outwardly away from the axis about which the table pivots. The flange 36 lies in a plane parallel to the plane of the table and therefore parallel to its plane of rotation. It will be evident that as the table 13 is rotated about its pivot axis 15 the bracket 35, including the outer edge 36a of the flange, will describe an arcuate path. A bracket 38 is connected to the upper surface 10a of support member 10, adjacent the edge of the table 13, by bolts 37. The bracket 38 has a flange 39 spaced from the support surface 10a and extending inwardly under the edge of the table in a direction toward the pivot axis 15 about which the table rotates and in the same plane as flange 36. The bracket 38 and flange 39 are elongated, the bracket extending across the support member 10 and the flange extending along the path described by the flange 36 as the table is rotated. The inner edge 39a of flange 39, which is spaced from the outer edge 36a of flange 36, is arcuate in conformation, along most of its span, and concentric with the path described by the outer edge 36a of flange 36 as the table is rotated.

A clamping member 40 has an upper jaw member 41 in the form of a rectangular block and a lower jaw member 42 which is also a rectangular block. The upper jaw member 41 defines an upper jaw 41a associated with flange 36, and an upper jaw 41b associated with flange 39. Lower jaw member 42 defines a lower jaw 42a associated with flange 36, and a lower jaw 42b associated with flange 39. The clamping member 40 has locking bolts 43 loosely received in the upper jaw member 41 and threadedly received in the lower jaw member 42. The heads 44 of the bolts, which have tool receiving sockets 45, engage the upper surface of the upper jaw member 41 and are supported thereby. The upper jaw member 41 is supported by flanges 36 and 39 and the bolts 43 pass between the respective edges 36a and 39a of the flanges, the heads of the bolts extending into bores, or openings, 46 extending through the end portion 21 of the swivel table and terminating at surface 21a thereof. Thus, the jaw members straddle the flanges to receive loosely the flanges therebetween when the bolts 43 are loosened and to secure said flanges against relative movement when the jaws are closed by the tightening of bolts 43.

End portion 21 of table 13 has connected thereto by bolt 47 and pin 48 an index finger 49 extending over flange 39 which can be read in conjunction with angular indications 50 marked on the top of flange 39 to gauge the position of the table 13 relative to the support 10.

In operation the flange 36 is received between jaws 41a and 42a of clamping member 40, and flange 39 is received between jaws 41b and 42b thereof. When loosened the bolts 43 hold the lower jaw member 42 loose and the swivel table 13 can be rotated relative to the support 10. When the table 13 is rotated the clamping member 40 is carried along flange 39 by the table since the heads 44 of the bolts 43 will engage the sides of the openings 46. Since the flange 36 moves with the clamping member and the flange 39 is elongated to extend along the path described by flange 36 as the table is rotated, the jaws of the clamping member are always in registration with both flanges. Therefore, at any selected position of the table, as for example, a position in which the workpiece 11 is oriented relative to the grinding wheel 12 for grinding a desired taper on the workpiece, the bolts 43 may be tightened from above the table to close the jaws and lock the respective flanges therein, thereby preventing relative rotation between table 13 and support member 10. Since both the jaws of the clamping member are loose and movable, and not rigidly connected to either table 13 or support member 10, they position themselves relative to the flanges when they are closed and the flanges are locked in their respective planes, eliminating deflection.

What is claimed is:

1. In a machine tool having a support and a swivel table pivotally mounted thereon to rotate in a plane about a pivot axis, the combination comprising a bracket connected to said support spaced from said pivot axis and having a flange above said support lying in a plane parallel to the plane of rotation of said swivel table, a flange connected to said swivel table and lying in the plane of the flange connected to said support, a clamping member having jaws to receive loosely both flanges and permit relative rotation therebetween, and means to close said jaws to lock said flanges therein and prevent relative rotation between the swivel table and the support.

2. In a machine tool having a support and a swivel table pivotally mounted in a plane above the support, the edge of the swivel table being swingable at least a predetermined amount relative to the support, the combination comprising a bracket connected to said support adjacent the edge of the swivel table and having a flange above said support lying in a plane parallel to the plane of the swivel table, a flange connected to the swivel table adjacent the edge thereof and lying in the plane of the flange connected to the support adjacent to but spaced from said flange, one of said flanges extending said predetermined amount, a clamping member received between the flanges and supported thereby, the clamping member having jaws to receive loosely both of said flanges and being fixed relative to the other of said flanges, and means on the clamping member to close said jaws.

3. In a machine tool a support, a swivel table pivotally mounted on the support to rotate in a plane about a pivot axis, the swivel table having a lower surface spaced from the support adjacent the edge of the table and having an opening through the table terminating at said surface, a bracket connected to the lower surface of the table adjacent the edge having a flange extending outwardly away from said pivot axis and lying in a plane parallel to the plane of rotation of the table, the flange describing an arc as the table is rotated, a bracket connected to the support adjacent the edge of the swivel table and having a flange extending inwardly under the table in the plane of the table flange, the inner edge of the support flange being spaced from the outer edge of the table flange and being of arcuate conformation extending along and concentric with the path described by the outer edge of the table flange as the table is rotated, and a clamping member including an upper jaw member supported by said flanges, a lower jaw member, a locking bolt supported by said upper jaw member and extending between said flange edges into threaded engagement with the lower jaw member, the locking bolt extending into the opening in the table to permit tightening thereof from above the table and to carry the clamping member along the support flange as the table is rotated.

References Cited in the file of this patent

UNITED STATES PATENTS

| | | |
|---|---|---|
| 1,040,137 | Browing | Oct. 1, 1912 |
| 1,666,313 | Sann | Apr. 17, 1928 |
| 2,004,738 | White et al. | June 11, 1935 |
| 2,132,924 | Belden | Oct. 11, 1938 |
| 2,373,637 | Kylin | Apr. 10, 1945 |
| 2,588,464 | Bargman | Mar. 11, 1952 |